US009830058B2

(12) United States Patent
Dewan et al.

(10) Patent No.: US 9,830,058 B2
(45) Date of Patent: Nov. 28, 2017

(54) GENERATING AN INSIGHT VIEW WHILE MAINTAINING REPORT CONTEXT

(71) Applicant: International Business Machines Corporation, Armonk, NY (US)

(72) Inventors: Prakash Dewan, Pune (IN); Jim V. Mathews, Pune (IN); Varun K. Mishra, Pune (IN)

(73) Assignee: International Business Machines Corporation, Armonk, NY (US)

( * ) Notice: Subject to any disclaimer, the term of this patent is extended or adjusted under 35 U.S.C. 154(b) by 682 days.

(21) Appl. No.: 14/489,089

(22) Filed: Sep. 17, 2014

(65) Prior Publication Data

US 2015/0040053 A1 Feb. 5, 2015

Related U.S. Application Data

(63) Continuation of application No. 13/836,105, filed on Mar. 15, 2013, now Pat. No. 9,715,331.

(51) Int. Cl.
| | |
|---|---|
| *G06F 3/048* | (2013.01) |
| *G06F 3/0484* | (2013.01) |
| *G06F 17/24* | (2006.01) |
| *G06F 3/0481* | (2013.01) |
| *G06F 17/30* | (2006.01) |

(52) U.S. Cl.
CPC ........ *G06F 3/04842* (2013.01); *G06F 3/0481* (2013.01); *G06F 3/0484* (2013.01); *G06F 17/246* (2013.01); *G06F 17/30994* (2013.01); *G06F 2203/04805* (2013.01)

(58) Field of Classification Search
CPC .. G06F 3/04842; G06F 3/0481; G06F 3/0484; G06F 17/246; G06F 17/30994; G06F 2203/04805
See application file for complete search history.

(56) References Cited

U.S. PATENT DOCUMENTS

| | | | |
|---|---|---|---|
| 5,841,435 | A | 11/1998 | Dauerer et al. |
| 6,301,579 | B1 | 10/2001 | Becker |
| 6,529,900 | B1 | 3/2003 | Patterson et al. |

(Continued)

OTHER PUBLICATIONS

Response to Office Action dated Feb. 9, 2016, from U.S. Appl. No. 13/836,105, filed May 9, 2016, 11 pp.

(Continued)

*Primary Examiner* — Anil N Kumar
(74) *Attorney, Agent, or Firm* — Shumaker & Sieffert, P.A.

(57) ABSTRACT

Techniques of the disclosure may include a computer-implemented method comprising displaying a GUI comprising a report including a first graphical representation of one or more data elements, receiving an input indicating a selection of a first data element included in the one or more data elements using an insight visualization tool; and displaying, as part of the GUI while maintaining display of the report, an insight view comprising respective graphical representations of a subset of the one or more data elements, the first data element included in the subset, wherein each of the respective graphical representations comprises one or more graphical regions corresponding to one or more sub-elements included in a data element represented by the respective graphical representation; and wherein the respective graphical representations of the insight view are displayed based at least in part on a display characteristic that defines the displaying of the report.

11 Claims, 6 Drawing Sheets

(56) References Cited

U.S. PATENT DOCUMENTS

| | | |
|---|---|---|
| 8,230,339 B2 | 7/2012 | Watanabe et al. |
| 2005/0108643 A1 | 5/2005 | Schybergson et al. |
| 2007/0005477 A1 | 1/2007 | McAtamney |
| 2009/0013281 A1 | 1/2009 | Helfman et al. |
| 2009/0096812 A1 | 4/2009 | Boixel et al. |
| 2010/0079459 A1 | 4/2010 | Breeds et al. |
| 2010/0194754 A1 | 8/2010 | Alsbury et al. |
| 2010/0214300 A1 | 8/2010 | Alsbury et al. |
| 2010/0231595 A1 | 9/2010 | Dang et al. |
| 2010/0251151 A1 | 9/2010 | Alsbury et al. |
| 2010/0313157 A1 | 12/2010 | Carlsson et al. |
| 2012/0144335 A1 | 6/2012 | Abeln et al. |

OTHER PUBLICATIONS

Advisory Action from U.S. Appl. No. 13/836,105, dated Oct. 3, 2016, 3 pp.

Notice of Allowance from U.S. Appl. No. 13/836,105, dated Mar. 20, 2017, 15 pp.

Office Action from U.S. Appl. No. 13/836,105, dated Feb. 9, 2016, 13 pp.

Final Office Action from U.S. Appl. No. 13/836,105, dated Jul. 16, 2015, 44 pp.

Response to the Final Office Action dated Jul. 16, 2015, from U.S. Appl. No. 13/836,105, filed Sep. 16, 2015, 16 pp.

Final Office Action from U.S. Appl. No. 13/836,105, dated Jun. 24, 2016, 15 pp.

Response to Final Office Action dated Jun. 24, 2016, from U.S. Appl. No. 13/836,105, filed Aug. 31, 2016, 6 pp.

Office Action from U.S. Appl. No. 13/836,105, dated Dec. 4, 2014, 15 pp.

Amendment in Response to Office Action dated Dec. 4, 2014, from U.S. Appl. No. 13/836,105, filed Mar. 3, 2015, 12 pp.

"Live Thumbnail View for Direct Viewing/Editing/Manipulating of Several Groups of Objects at Once," IP.com/IPCOM/000167114, Jan. 30, 2008, 1 pp.

U.S. Appl. No. 13/836,105, by Prakash Dewan et al., filed Mar. 15, 2013.

Response to Office Action dated Jun. 24, 2016, from U.S. Appl. No. 13/836,105, filed Nov. 23, 016, 11 pp.

GENERATING AN INSIGHT VIEW WHILE MAINTAINING REPORT CONTEXT

This application is a Continuation of U.S. application Ser. No. 13/836,105, filed Mar. 15, 2013 entitled GENERATING AN INSIGHT VIEW WHILE MAINTAINING REPORT CONTEXT, the entire content of which is incorporated herein by reference.

FIELD OF INVENTION

The disclosure relates to report generation in computing systems.

BACKGROUND

Enterprise software systems are typically sophisticated, large-scale systems that support many, e.g., hundreds or thousands, of concurrent users. Examples of enterprise software systems include financial planning systems, budget planning systems, order management systems, inventory management systems, sales force management systems, business intelligence tools, enterprise reporting tools, project and resource management systems, and other enterprise software systems.

Many enterprise performance management and business planning applications require a large base of users to enter data that the software then accumulates into higher level areas of responsibility in the organization. Often these complex systems make use of multidimensional data sources that organize and manipulate the tremendous volume of data using data structures referred to as data cubes. A data cube may, for example, include a plurality of hierarchical dimensions having levels and members for storing the multidimensional data. Once data has been entered, a user may wish to view some or all of the data in a coherent manner by generating a report. The system may perform mathematical calculations on the data, combining data submitted by many users. Using the results of these calculations, the system may generate reports for review by higher management.

Reporting and analysis end user products (typically referred to as Business Intelligence, or BI, tools) allow users to author reports and perform data exploration and analysis on a myriad of data sources, such as multi-dimensional data structures, relational databases, flat files, Extensible Markup Language ("XML") data, data streams, and unorganized text and data. Business intelligence tools may be used to prepare and aggregate individual reports and analyses by executing queries on underlying data sources, and to present those reports and analyses in a user-accessible format.

SUMMARY

Techniques are described for providing a clear and easy interface usable to quickly view details of one or more data elements included in a business report or analysis. The techniques may, for example, provide a software tool, or "insight visualization tool," as part of a graphical user interface (GUI) that enables a user to select a data element to view further details of the element while maintaining a context of the underlying report. That is, rather than replacing the context of the underlying report in response to selecting the data element, techniques of the disclosure may leave the original context for a visualization of the underlying report unaffected, while outputting further details about the selected data element. In this way, techniques of the disclosure may provide detailed views of specific data elements without destroying the original context. In some examples, the type of visualization or number of details shown may vary depending upon which of one or more options associated with the software tool is chosen by the user.

In one example, the disclosure is directed to a computer-implemented method comprising displaying, by a computing device, a graphical user interface (GUI) comprising a report, wherein the report comprises a first graphical representation of each of one or more data elements that each corresponds to one or more sub-elements, receiving, by the computing device, an input indicating a selection of the first graphical representation of a first data element included in the one or more data elements using an insight visualization tool, and responsive to receiving the input, displaying, by the computing device and as part of the GUI while maintaining display of the report, an insight view comprising a second graphical representation of each of a subset of the one or more data elements, the first data element included in the subset, wherein each of the second graphical representations comprises one or more graphical regions corresponding to the one or more sub-elements included in the corresponding data element, and wherein the insight view maintains at least one of: one or more dimensions included in the report, a scale of the one or more dimensions, and relative sizing of the first graphical representations with respect to one another.

In another example, the disclosure is directed to a computing system comprising: at least one processor, a user interface module operable by the at least one processor to: display a graphical user interface (GUI) comprising a report, wherein the report comprises a first graphical representation of each of one or more data elements that each corresponds to one or more sub-elements; and receive an input indicating a selection of the first graphical representation of a first data element included in the one or more data elements using an insight visualization tool; and an insight module, operable by the at least one processor to generate, responsive to receiving the input, an insight view comprising a second graphical representation of each of a subset of the one or more data elements, the first data element included in the subset, wherein each of the second graphical representations comprises one or more graphical regions corresponding to the one or more sub-elements included in the corresponding data element; wherein the insight view maintains at least one of: one or more dimensions included in the report, a scale of the one or more dimensions, and relative sizing of the first graphical representations with respect to one another; and wherein the user interface module is further operable by the at least one processor to display, as part of the GUI while maintaining display of the report, the insight view.

In another example, the disclosure is directed to a computer program product comprising a computer-readable storage medium having program code embodied therewith, the program code executable by a computing device to perform a method comprising: displaying, by the computing device, a graphical user interface (GUI) comprising a report, wherein the report comprises a first graphical representation of each of one or more data elements that each corresponds to one or more sub-elements, receiving, by the computing device, an input indicating a selection of the first graphical representation of a first data element included in the one or more data elements using an insight visualization tool, and responsive to receiving the input, displaying, by the computing device and as part of the GUI while maintaining display of the report, an insight view comprising a second graphical representation of each of a subset of the one or more data elements, the first data element included in the subset, wherein each of the second graphical representations comprises one or more graphical regions corresponding to the one or more sub-elements included in the corresponding data element, and wherein the insight view maintains at least one of: one or more dimensions included in the report, a scale of one or more dimensions, and relative sizing of the first graphical representations with respect to one another.

The details of one or more examples are set forth in the accompanying drawings and the description below. Other features, objects, and advantages will be apparent from the description and drawings, and from the claims.

DETAILED DESCRIPTION

Figure 1:
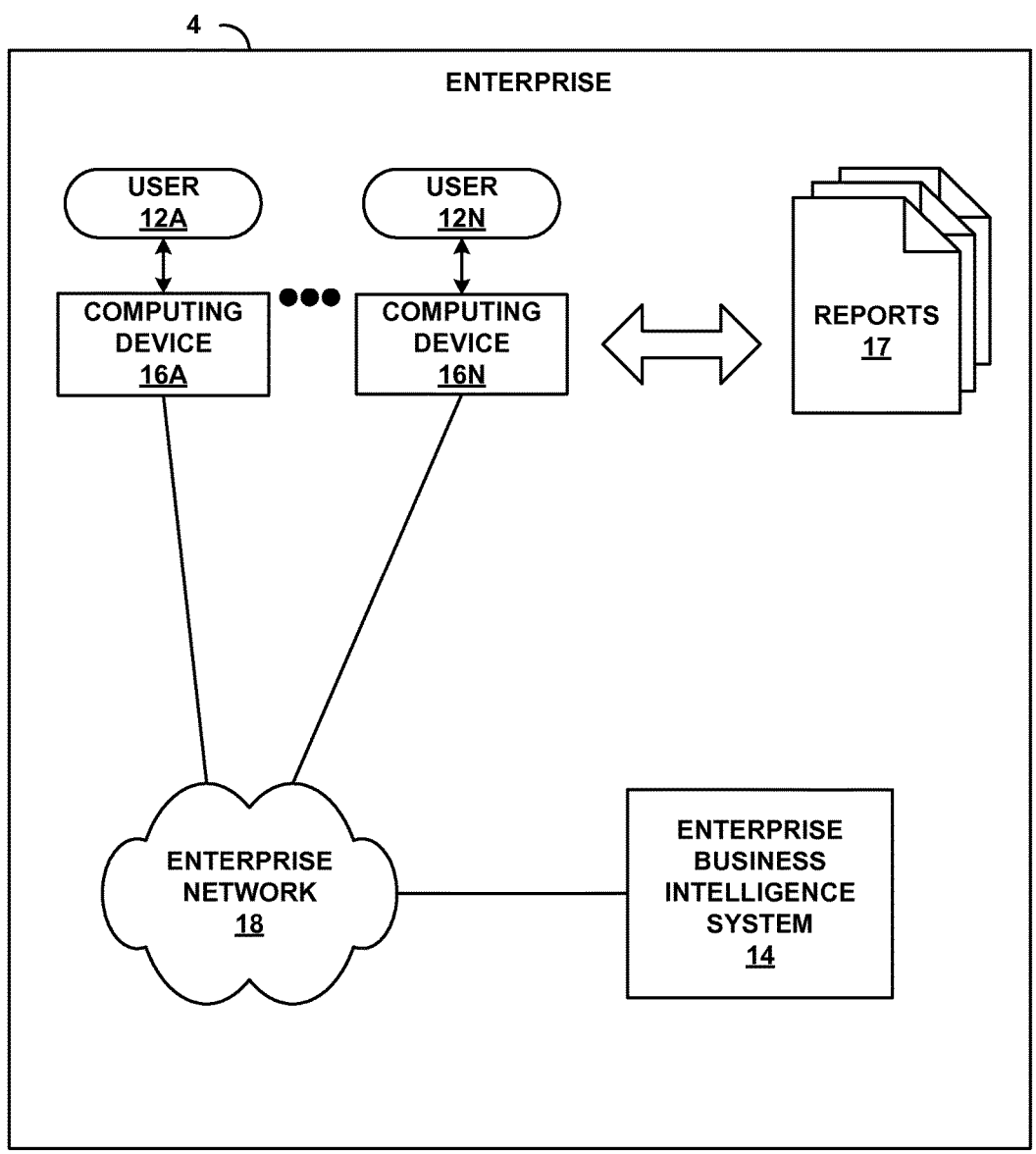
FIG. 1 is a block diagram illustrating an example computing environment in which a plurality of users interact with an enterprise business intelligence system, in accordance with one or more aspects of the present disclosure.

FIG. 1 illustrates an example context in which techniques disclosed herein may be used. FIG. 1 is a block diagram illustrating an example enterprise 4 in which a plurality of users 12A-12N (collectively "users 12") may interact with an enterprise business intelligence system 14, in accordance with one or more aspects of the present disclosure. As shown in the example system of FIG. 1, enterprise business intelligence system 14 may be communicatively coupled to a number of computing devices 16A-16N (collectively "computing devices 16") by an enterprise network 18. Users 12 interact with their respective computing devices to access enterprise business intelligence system 14 and input, modify, and review data. In one example, users 12 may use computing devices 16 to access enterprise business intelligence system 14 and author one or more reports 17. Reports 17 may include business intelligence reports, such as sales reports, revenue reports, payroll reports, etc. Enterprise business intelligence system 14 may provide users 12 with functionality to create reports 17 and view details of displayed data elements using an insight visualization tool. Users 12, computing devices 16A-16N, enterprise network 18, and enterprise business intelligence system 14 may all be either in a single facility or widely dispersed in two or more separate locations anywhere in the world, in different examples.

For exemplary purposes, various examples of the techniques of this disclosure may be readily applied to various software systems executed by various devices, including enterprise business intelligence systems, other large-scale enterprise software systems, as well as single-user, standalone software applications. Examples of enterprise software systems include enterprise financial or budget planning systems, order management systems, inventory management systems, sales force management systems, business intelligence tools, enterprise reporting tools, project and resource management systems, and other enterprise software systems. Other example applications include spreadsheet applications, tax assessment software, or any environment where focused visualizations that maintain context may be beneficial. For instance, techniques of this disclosure may be readily applied by user interfaces for viewing personal or business finances.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In the example of FIG. 1, typically, users 12 may use a user-configurable business intelligence user interface (UI) to view and manipulate data (e.g., generate reports 17) via their respective computing devices 16. This may include data from any of a wide variety of sources, including from multidimensional data structures and relational databases within enterprise 4, as well as data from a variety of external sources that may be accessible over a public network. Multidimensional data structures are "multidimensional" in that each multidimensional data element is defined by a plurality of different object types, where each object is associated with a different dimension. Users 12 may, for example, retrieve data related to store sales by entering a name of a sales person, a store identifier, a date, a product, and a price at which the product was sold, into their respective computing devices 16.

Enterprise users 12 may use a variety of different types of computing devices 16 to run a business intelligence UI and to generate business intelligence reports 17 or otherwise interact with enterprise business intelligence system 14 via enterprise network 18. For example, an enterprise user 12 may run a business intelligence UI and interact with enterprise business intelligence system 14 using a laptop computer, desktop computer, or the like, running a web browser. Alternatively, an enterprise user may use a smartphone or similar device, running a business intelligence UI in either a web browser or a dedicated mobile application for interacting with enterprise business intelligence system 14. Further examples of computing devices 16 may include workstation computers, netbooks, tablet computers, E-readers, or any other such computing device. In either case, a business intelligence UI running on a user's computing device 16 may access various data sources from within enterprise business intelligence system 14, as well as any of a variety of external network resources and any of a variety of external data sources.

Enterprise network 18 may represent any communication network, such as a packet-based digital network like a private enterprise intranet or a public network like the Internet. In this manner, enterprise network 18 can readily scale to suit large enterprises. Enterprise users 12 may directly access enterprise business intelligence system 14 via a local area network, or may remotely access enterprise business intelligence system 14 via a virtual private network, remote dial-up, or similar remote access communication mechanism.

In some examples, the business intelligence UI running on computing devices 16 may use retrieved data to generate one or more reports 17. In other examples, enterprise business intelligence system 14 may generate reports 17 and provide reports 17 to one or more of computing devices 16. That is, in some examples, one or more techniques of the present disclosure may be performed by one or more devices or systems external to computing devices 16. Computing devices 16 may send indications of input to the remote devices which perform techniques of the present disclosure and receive data (e.g., reports 17) from the remote devices for display.

Reports 17 may include a graphical representation or depiction of data such as tables, charts, graphs, or other methods of disseminating information. For example, reports 17 may include a graph with sales values assigned to a vertical axis, and time values assigned to a horizontal axis, a chart of revenue values recorded for various sales regions, a table of payroll data values recorded for different enterprise locations, a graph of enterprise spending by department, etc. Users 12 may interact with computing devices 16 to generate one or more reports 17 by selecting different data elements and/or dimensions to display in reports 17. Various data elements or dimensions of enterprise data may be organized in a hierarchy, divisible into sub-elements or having other selectable attributes. A data element may represent a collection or aggregation of data that can be defined by their values for a particular dimension. Examples of hierarchical data elements include a sales zone data element comprising a collection of data that all have the same value for a state dimension, a business region data element, comprising a collection of data that all have the same value for a business region dimension (e.g., an area defined by a state, a country, a continent, or some other defined region), a high-profit stores data element comprising a collection of data that all have values of a profit dimension meeting certain criteria (e.g., profit greater than a certain amount), etc.

Sub-elements may represent collections or aggregations of data within a data element or higher sub-element, based on the data's values for a dimension. That is, sub-elements may be aggregations or collections of data within a data element or sub-element. Examples of sub-elements may include more specific areas or locations, such as a city sub-element of a particular state data element, comprising a collection of data included in the state data element that all have the same value for a city dimension, product types, such as a sporting goods sub-element of a data element, comprising data included in the data element that all have the same value for a product type dimension, store size, such as a large store sub-element of a data element, comprising data included in the data element that all have a value for a number-of-employees dimension that meets a certain criteria (e.g., number of employees above a certain amount), or other information types. In some examples, the defining dimension of a sub-element may be the same as the defining dimension of the data element or sub-element to which it belongs (e.g., a high-profit sub-element of a profitable stores data element). In other examples, the defining dimension of a sub-element may be different than the dimension of the data element or sub-element to which it belongs (e.g., a sporting goods sub-element of a China data element). Generally, reports may display one or more dimensions for a number of data elements. If a user desires to see other dimensions of the data elements, details of the sub-elements that comprise the data elements, or some other visualization, the user may be required to generate a new report. That is, business intelligence tools often require the user to generate a new report thereby losing the context of the original report. In other examples, a report may not include all the details from the underlying data. Users may desire to view various details or information regarding the underlying data without being required to generate and display a separate report.

Techniques of the present disclosure may improve user efficiency in working with business reporting and analysis by providing a method and system to provide visualization with interactivity that will allow users to perform deeper and more focused analysis on a data element without losing the original context. A computing device may provide an insight visualization tool that a user may drag and drop over any data element displayed in a report to display other information regarding the data element. That is, identifying the area or data element of the underlying report that is to be focused on for further analysis may be done by, in one example, the user using a dedicated GUI object, such as the insight visualization tool, along with a combination of one or more mouse or keyboard actions. In other examples, the user my identify data elements via any other combination of mouse or keyboard actions such as hotkeys, shortcuts, context menus, or other methods.

Deeper and more focused analysis may be made available to users in the form of an "insight view," implemented as, in various examples, a layer on top of the original visualization, an in-place visualization, where data elements not within the insight view may shrink to provide enough space for those data elements focused upon by the insight view, or in any other way. For example, as further illustrated in FIG. 3, in response to a user's placement of the insight visualization tool, computing device 16A may display an insight view (e.g., a focused visualization) including values for sub-elements of the specified data element, while maintaining a context of the original report. The context of a report may, in various examples, include one or more dimensions of the report, the scale of dimensions included in the report, the relative sizing of data elements included in the report with respect to other data elements included in the report, the particular data elements that are included in the original report (e.g., data elements other than those selected for an insight view), or other traits of the original report that may be maintained in the insight view.

In some examples, the details shown in the insight view may vary depending upon one or more options associated with the insight visualization tool. For instance, different insight options may cause the computing device to display different insight views, each modifying the dimensions of the specified data element. Examples of insight views include a higher level of detail for the current dimension (e.g., a drill-down visualization where the sublevels of a dimension used in the report forms the basis of the new visualization), a different dimension or category of the specified data element (e.g., a drill-through visualization), or an entirely different visualization (e.g., another report). In various examples, the insight options that define the type of chart or visualization used in the insight view may be preconfigured by the author of the underlying report, selected by the user at runtime, or selected by the computing system itself (e.g., based on some known or newly discovered method).

The insight visualization tool may also provide users with a way to save the visualization present in one or more insight views, either through a single action or a series of user actions. The visualization may, in various non-limiting examples, be saved as a report, a visualization, or a dashboard for future reference. The insight visualization tool may, in some examples, also provide the user with a way to "pull out" or "tear off" the visualization present in an insight view and carry out further analysis on the visualization independent of the original report. That is, the insight view may be disassociated from the report by a user. In some examples, the user may also be able to use the insight visualization tool within an insight view. That is, generating insight views may be recursive such that an insight view may be treated the same as an underlying report for the purposes of generating a second or subsequent insight view.

In accordance with techniques of the disclosure a computing device may display a GUI including a report. The report may include a first graphical representation of each of one or more data elements, and each data element may be made up of one or more sub-elements. The first graphical representations may, for instance, be bars of a bar chart, or sections of a pie chart. The computing device may receive an input indicating a selection of the first graphical representation of a first data element included in the one or more data elements using an insight visualization tool. In some examples, the insight visualization tool may be a button or graphical object selectable by a user. In other examples, the insight visualization tool may be usable by other means. In any case, responsive to receiving the input, the computing device may display and insight view as part of the GUI while maintaining display of the report. That is, in some examples, the computing device may display the insight view as a "superposed layer" on top of the report. In other examples, the insight view may appear as an "x-ray" view of the first graphical representations.

The insight view may include a second graphical representation of each of a subset of the one or more data elements, the first data element being included in the subset. That is, the computing device may display new graphical representations for some of the data elements as part of the insight view. In some examples, the second graphical representations may be the same size and shape as the first graphical representations. In other examples, the second graphical representations may be larger, or otherwise modified representations. Each of the second graphical representations may include one or more graphical regions that correspond to the one or more sub-elements of the data element. That is, the second graphical representation of a data element may be separated into a number of graphical regions, corresponding to proportional sizes of the sub-elements. The insight view may maintain at least one of one or more dimensions included in the report, a scale of the one or more dimensions, and relative sizing of the first graphical representations with respect to one another. That is, the context of the original report may be maintained in the insight view by incorporating various attributes of the original report. For instance, if a first graphical representation of a first data element was twice the size of a first graphical representation of a second data element, then the second graphical representation of the first data element will be twice the size of the second graphical representation of the second element.

By providing an insight visualization tool that users can place over any data element to cause an insight view to show further details about the concerned data elements, techniques of the present disclosure may enable business users to perform quick analysis and review by performing functions similar to drilling down, changing categories, and drilling through reports without having to move away from the current report, or lose context of the insight. The insight visualization tool may include options which may be set to render aggregates at a next level of the current dimension, across different dimensions, or within a new, pre-configured visualization having different metrics from the report. Furthermore, techniques of the present disclosure may boost the usability of visualizations built from multi-dimensional data models by providing easy access to multiple levels at once. In some examples, the original report visualization may remain unaffected, but the insight view, shown layered on top of the report, may vanish as soon as the user removes the insight visualization tool from the data element. That is, techniques of the present disclosure may save users time and effort in analyzing further details by allowing the user to stay on the same report or chart.

Figure 2:
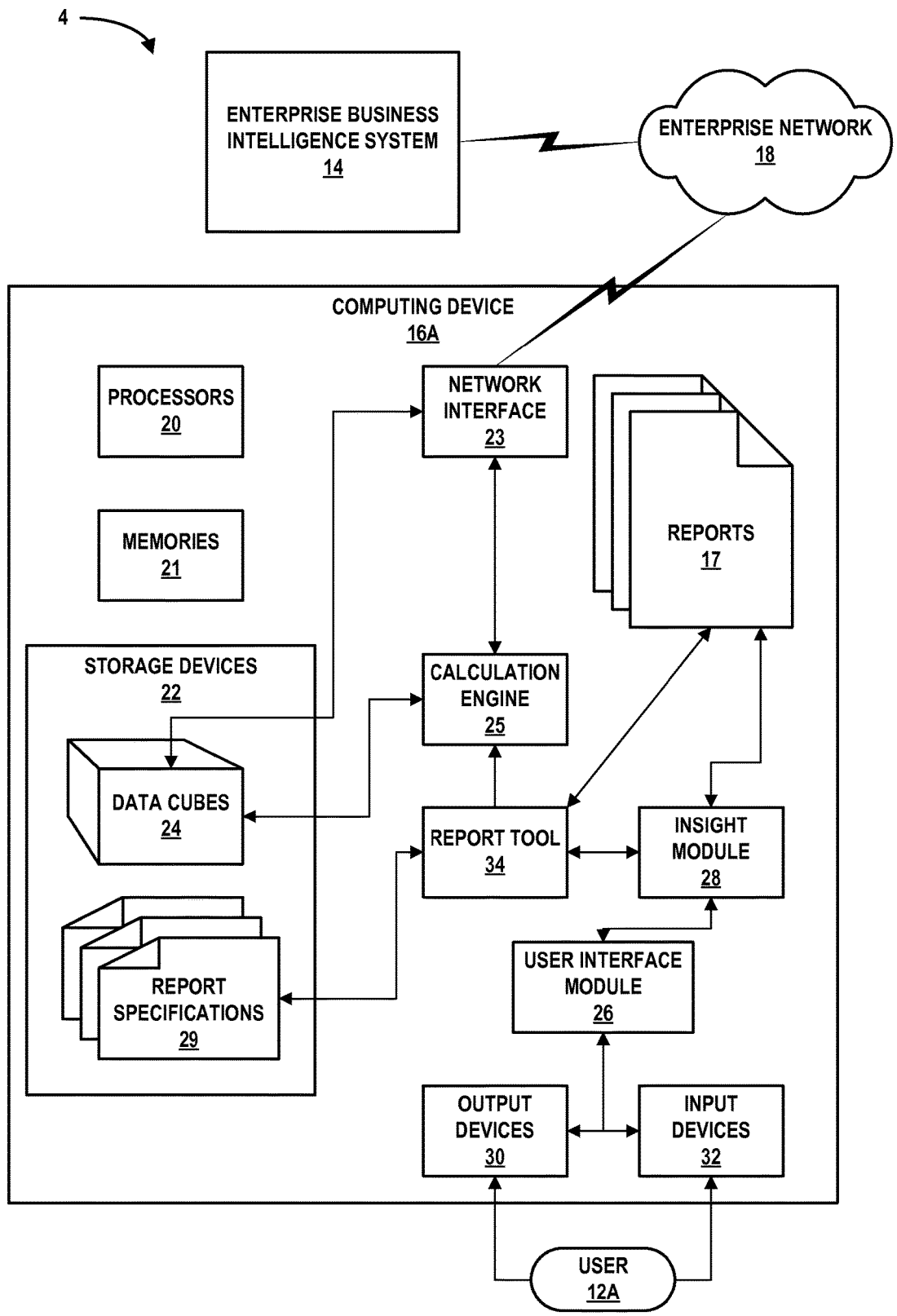
FIG. 2 is a block diagram illustrating one example of a computing device for interacting with the enterprise business intelligence system of FIG. 1, in accordance with one or more aspects of the present disclosure.

FIG. 2 is a block diagram illustrating one example of a computing device 16A for interacting with the enterprise business intelligence system 14 of FIG. 1, in accordance with one or more aspects of the present disclosure. Computing device 16A includes one or more processors 20, one or more memories 21, and one or more storage devices 22. In addition, computing device 16A includes network interface 23, calculation engine 25, user interface (UI) module 26, insight module 28, one or more output devices 30, one or more input devices 32 and report tool 34. Storage devices 22 may contain data cubes 24 as shown in FIG. 2. In other examples, storage devices 22 may contain other components of computing device 16A. One or more of the components illustrated in FIG. 2 may be operatively coupled using wired or wireless communication links, a system bus, network connection, interprocess communication data structure, or any other channel for communicating data. Computing device 16A may, in some examples, include channels for communication not shown in FIG. 2. Connections shown in FIG. 2 may represent specific flows of information, but one or more modules may send and/or receive information via other communication connections as well. For instance, user interface module 26 may communicate or otherwise be operatively coupled with memories 21 and/or processors 20, though no such connection is shown in FIG. 2.

Processors 20, in one example, are configured to implement functionality and/or process instructions for execution within computing device 16A. For example, processors 20 may be capable of executing instructions of various components of computing device 16A, such as calculation engine 25. Examples of processors 20 may include, any one or more of a microprocessor, a controller, a digital signal processor (DSP), an application specific integrated circuit (ASIC), a field-programmable gate array (FPGA), or equivalent discrete or integrated logic circuitry.

One or more memories 21 may be configured to store information within computing device 16A during operation. Memories 21, in some examples, are a temporary memory, meaning that a primary purpose of memories 21 is not long-term storage. Memories 21, in some examples, are described as volatile memory, meaning that memories 21 do not maintain stored contents when the computer is turned off. Examples of volatile memories include random access memories (RAM), dynamic random access memories (DRAM), static random access memories (SRAM), and other forms of volatile memories known in the art. In some examples, memories 21 are used to store program instructions for execution by processors 20. Memories 21, in one example, are used by software or applications running on computing device 16A (e.g., calculation engine 25, modules 26 and 28, or report tool 34) to temporarily store information during program execution.

Storage devices 22, in some examples, include one or more computer-readable storage media. Storage devices 22 may be configured to store larger amounts of information than volatile memory. Storage devices 22 may further be configured for long-term storage of information. In some examples, storage devices 22 include non-volatile storage elements. Examples of such non-volatile storage elements include magnetic hard discs, optical discs, floppy discs, flash memories, or forms of electrically programmable memories (EPROM) or electrically erasable and programmable memories (EEPROM). In the example of FIG. 2, storage devices 22 may store data cubes 24 for use during operation of computing device 16A.

Computing device 16A, in some examples, includes network interface 23. Network interface may provide functionality to communicate with external devices, such as enterprise business intelligence system 14, via one or more networks (e.g., enterprise network 18). Network interface 23 may include a network interface card, such as an Ethernet card, an optical transceiver, a radio frequency transceiver, or any other type of device that can send and receive information. Other examples of such network interfaces may include 3G and WiFi radio components, as well as Universal Serial Bus (USB). In some examples, computing device 16A utilizes network interface 23 to communicate with enterprise business intelligence system 14 when sending or receiving multidimensional data, such as when retrieving data for reports 17 and/or insight views.

In the example of FIG. 2, computing device 16A may include one or more data cubes 24 within storage devices 22. Data cubes 24 may store data from user 12A and/or from data sources of enterprise business intelligence system 14 via enterprise network 18. Data stored in data cubes 24 may provide the underlying data for computing device 16A to create reports 17 and/or insight views. Data cubes 24 may include two-dimensional databases and/or multidimensional databases, i.e. cubes. Data cubes 24 may be implemented using a variety of vendor platforms, and may be distributed throughout the enterprise via network interface 23. As one example, data cubes 24 may be multidimensional databases configured for Online Analytical Processing (OLAP). As another example, data cubes 24 may be multidimensional databases configured to receive and execute Multidimensional Expression (MDX) queries of some arbitrary level of complexity. As yet another example, data cubes 24 may be two-dimensional relational databases configured to receive and execute SQL queries, also with an arbitrary level of complexity. Storing data cubes 24 locally within storage devices 22 may allow some or all calculation required in generating reports 17 and/or insight views to be performed locally by computing device 16A. In other examples, computing device 16A may not store data cubes 24 locally, and one or more devices, such as enterprise business intelligence system 14 may perform the required calculation.

Computing device 16A, in some examples, includes calculation engine 25. Calculation engine 25 may include instructions operable by processors 20 via memories 21 to receive report specifications 29 and perform calculations to generate reports 17 and/or insight views. Report specifications 29 may be one or more documents that provide the structure and required content of a report (e.g. reports 17). In some examples, report specifications 29 may consist of documents or files containing markup language (e.g., XML) instructions defining various requirements for a report. For instance, a report specification may define the layout of various charts and tables to be displayed in a report. Report specifications 29 may include one or more definitions specifying which data element or elements are to be included in parts of reports 17. The definitions within a report specification may be created in a query language, (e.g., SQL), and may be executable by components of computing device 16A to cause retrieval of the defined data elements from underlying data sources. As one example, a definition may cause a report to include all data elements belonging to a particular hierarchy.

Calculation engine 25 may receive a request from report tool 34 to determine one or more calculations regarding specific data within multidimensional data of enterprise 4. In other examples, calculation engine 25 may receive a request to aggregate or sum data of a particular dimension, or a request to determine current values of items within a dimension. Calculation engine 25 may retrieve relevant enterprise data from data cubes 24 and/or enterprise business intelligence system 14 via network interface 23 and perform the requested calculations. The results of calculations performed by calculation engine 25 may be sent to other components associated with computing device 16A, such as insight module 28 or report tool 34.

As shown in the example of FIG. 2, computing device 16A may include report tool 34. Report tool 34 may include instructions operable by processors 20 via memories 21 to receive data from calculation engine 25 and generate one or more reports 17 based one or more report specifications. In the example of FIG. 2, report tool 34 outputs reports 17 locally at computing device 16A. In other examples, report tool 34 may output reports 17 to enterprise business intelligence system 14, or to others of computing devices 16 via network interface 23.

Computing device 16A, in some examples, includes insight module 28. Insight module 28 may include instructions operable by processors 20 via memories 21 to receive input from UI module 26, and generate an insight view in one of reports 17 based on the received input. Insight module 28 may access reports generated by report tool 34 to obtain an indication of one or more specific data elements for a specific one of reports 17. Insight module 28 may include instructions operable by processors 20 via memories 21 to generate one or more queries to query calculation engine 25 for data associated with the specific data elements, such as the underlying data from which the data element was aggregated (e.g., the element's sub-elements). Insight module 28 may also be operable to generate report specifications, provide the report specifications to report tool 34, receive the generated report, and output the generated report for display as an insight view over and/or in addition to the original report. That is, definition module 28 may receive input to generate an insight view, output report specifications for generating a report, output queries based on the definitions to obtain the requisite data (e.g., from data cubes 24), receive the generated report, and provide the generated report for display as an insight view while maintaining the context of the underlying one of reports 17.

As shown in the example of FIG. 2, computing device 16A may include UI module 26. UI module 26 may include instructions operable by processors 20 via memories 21 to interact with output devices 20 and/or input devices 32 to provide an interface to user 12A enabling creation of one or more reports 17 and/or use of an insight visualization tool for providing insight views. That is, UI module 26 may output a GUI for display (e.g., at one or more of output devices 30) with which user 12A can interact (e.g., by using one or more of input devices 32) to cause computing device 16A to generate and display reports 17 and/or generate one or more insight views based on data elements included in reports 17.

UI module 26 may output information to user 12A via one or more of output devices 30 operatively coupled to computing device 16A. Output devices 30, in some examples, are configured to provide output to a user using tactile, audio, or video stimuli. Output devices 30 may include a presence-sensitive display, a sound card, a video graphics adapter card, or any other type of device for converting a signal into an appropriate form understandable to humans or machines. Additional examples of output devices 30 include a speaker, a cathode ray tube (CRT) monitor, a liquid crystal display (LCD), or any other type of device that can generate intelligible output to a user. UI module 26 may receive input from user 12A via one or more input devices 32. Input devices 32 may be part of computing device 16A, or may be communicatively coupled to computing device 16A. Input devices 32 may include a keyboard, a mouse, a touch-sensitive or presence-sensitive display, a stylus, or any device operable to provide machine input.

In accordance with one or more aspects of the present disclosure, UI module 26 may provide user 12A with a way of generating and displaying insight views by outputting an insight visualization tool for display at output devices 30 along with reports 17. The insight visualization tool may guide user 12A through the selection of one or more insight options to determine the type of insight view desired, as well as selection of one or more data elements included in reports 17. For example, UI module 26 may output a report for display at output devices 30, having a graphical representation of one or more data elements included in the report. UI module 26 may also output an insight visualization tool for display. In some examples, the insight visualization tool may include a button, a menu option, or other form of UI component with which the user may interact. In other examples, UI module 26 may not output the insight visualization tool for display. For instance, the insight visualization tool may be selectable via other means, such as a keyboard shortcut or specific button of an input device.

The insight visualization tool may be selectable by, in some examples, a selection via one or more input devices 32 (e.g., a mouse, a touch on a presence-sensitive device, or other input method). For instance, the insight visualization tool may be a selectable icon that the user can enable by performing a single click of the mouse while the cursor is located at a same location of an output device that the insight visualization tool is located. In other examples, the user may utilize the insight visualization tool by a continued selection of the insight visualization tool (e.g., a mouse click-and-drag operation), by pressing a shortcut key on a keyboard, by speaking a voice command, or through other means of input.

UI module 26 may receive input indicating user 12A's selection of the insight visualization tool. In some examples, responsive to receiving the input, UI module 26 may output a number of insight options for display at one or more of output devices 30 as part of the UI. The insight options may correspond to various types of insight views which may be generated based on the underlying report. The types of insight views available for a report may be determined by an author of the report, by computing device 16A (e.g., automatically, based on the data included in the report), by user 12A, or by any other entity. In other examples, such as when only one insight view exists, UI module 26 may not output insight options for display. In any case, UI module 26 may enter an "insight mode" in response to receiving an indication of user 12A's selection of the insight visualization tool and/or an insight option. Insight mode may allow user 12A to indicate a specific data element of the report into which user 12A desires to gain insight. In this way, UI module 26 may allow user 12A to view various details of one or more data elements of a report while maintaining the context of the underlying report.

UI module 26 may receive, from input devices 32, input indicating a selection of a data element included in the underlying report. In response to receiving the input, UI module 26 may cause insight module 28 to create report specifications and/or queries based on the selected insight option and/or data element. In accordance with one or more techniques of the present disclosure, insight module 28 may receive an insight view generated by report tool 34. Insight module 28 may cause UI module 26 to output at least a part of the generated insight view for display in addition to the underlying report, such that the insight view is displayed while maintaining display of the underlying one of reports 17 upon which the insight view was generated. Maintaining the display of the underlying report, in some examples, may mean that when UI module 26 outputs an insight view for display, UI module 26 may continue to output the underlying report as well. In other words, the displayed report may be maintained for view in addition to the insight view. In some examples the underlying report may be maintained in exactly the same format. In other examples, UI module 26 may maintain the display of the underlying report, but modify the display in order to accommodate the insight view. In this way, UI module 26 may allow user 12A to view various types of details about data elements within a report by selecting an insight visualization tool, choosing an insight option and selecting a data element. That is, techniques of the present disclosure may provide an intuitive user interface for causing a computing device to generate and display insight views that maintain a context of the underlying report. UI module 26 is further described with respect to the specific examples of FIGS. 3, 4, and 5 below.

Figure 3:
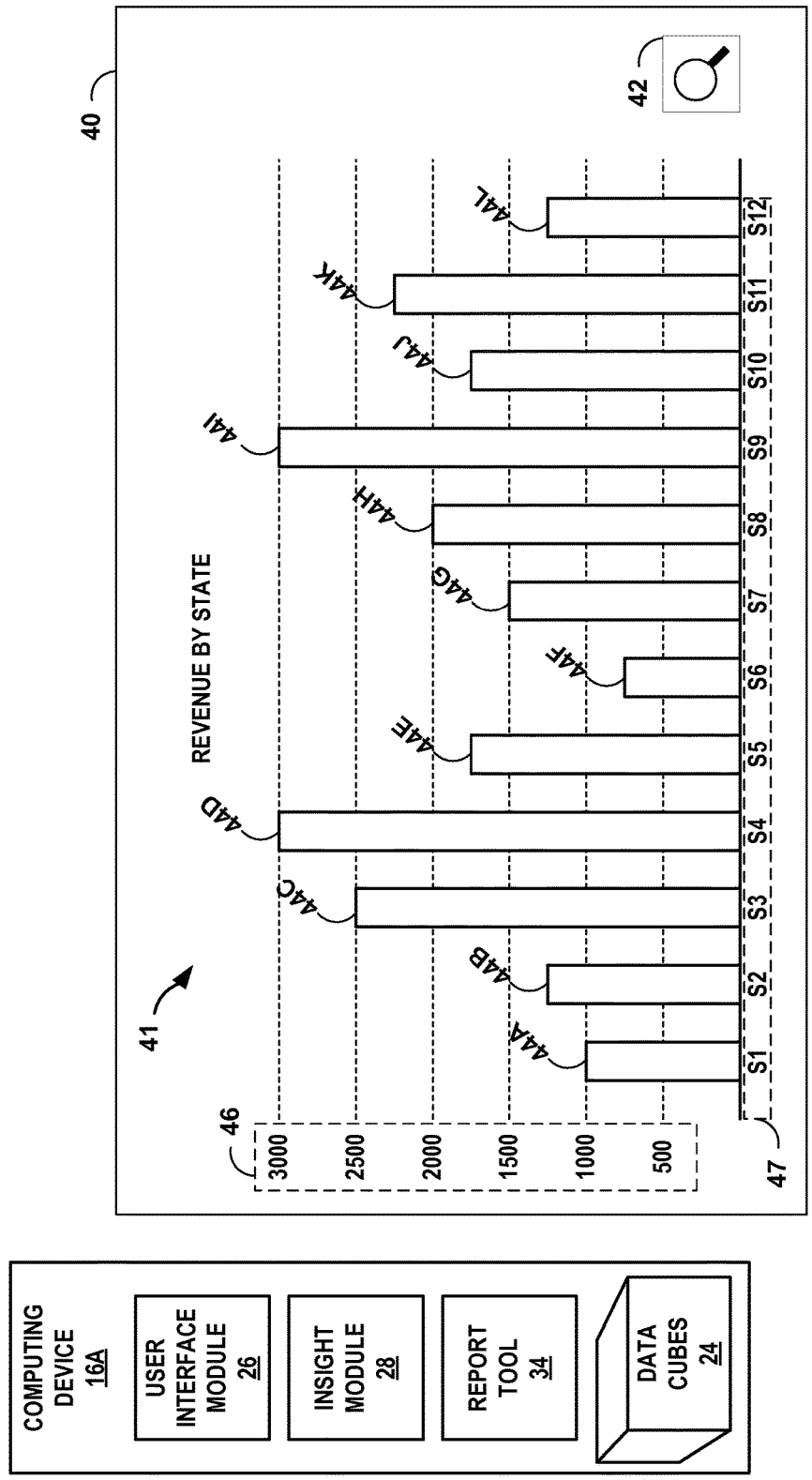
FIG. 3 is a block diagram illustrating an example computing device and GUI for providing an insight view, in accordance with one or more aspects of the present disclosure.

FIG. 3 is a block diagram illustrating an example computing device and GUI for providing an insight view, in accordance with one or more aspects of the present disclosure. For purposes of illustration, the example shown in FIG. 3 is described in the context of computing device 16A and enterprise business intelligence system 14 as shown in FIGS. 1 and 2. As shown in FIG. 3, computing device 16A includes components, such as UI module 26, insight module 28, report tool 34, and data cubes 24. Components of computing device 16A can include functionality similar to the functionality of such components as described in FIGS. 1 and 2.

In some example techniques, UI module 26 may output for display a business intelligence GUI including a report (e.g., one of reports 17) and an insight visualization tool. The report may include one or more graphical representations of data elements and one or more dimensions of the data elements. Examples of a graphical representation of a data element include a graphical object (e.g. a bar of a bar chart or wedge of a pie chart), a numerical value (e.g., a cell in a table or crosstab chart), or other graphical representations. Dimensions of a data element may, in some examples, include a value of the data element, such as a dollar value representing revenue for a sales area, a number value representing a workforce for a company, a product type value for a store, or any other axis of a data cube through which a user may differentiate the data.

In the example of FIG. 3, report tool 34 may generate GUI 40. GUI 40 may include report 41 and insight visualization tool 42. As shown in FIG. 3, report 41 may include graphical representations 42A-42L (collectively "graphical representations 44") of various data elements. Report 41 may also include revenue dimension 46 and state dimension 47 upon which the underlying data elements are considered. For instance, report 41 may be generated by report tool 34 by aggregating the revenue values of all sub-elements having the same state value (e.g., for various cities, products, and so on), and creating graphical representations 44 of the data elements based on the aggregated values. That is, as shown in FIG. 3, graphical representations 44 may be displayed within a context of report 41. The context of report 41 may include one or more of the traits inherent to report 41. In the example of FIG. 3, the context may include the fact that report 41 includes revenue dimension 46 and state dimension 47, the values of graphical representations 44, the scale of revenue dimension 46, the sizing of graphical representations 44, as well as other traits of report 41. For instance, the context of report 41 may include the ability to compare, for example, graphical representation 44D and 44I to determine that the revenue value of each of the underlying data elements is approximately 3,000. In other words, the context of report 41 may include the vertical height of each of graphical representations 44, which allows a user to compare revenue differences among the various data elements.

Insight visualization tool 42 may, as shown in the example of FIG. 3, be a user-selectable button output for display as part of GUI 40 by UI module 26. While shown to the right of report 41 in FIG. 3, insight visualization tool 42 may be placed in other positions or displayed at other ones of output devices 30. Other examples of insight visualization tool 42 may include an option on a selectable menu (e.g., a drop-down menu), a specific gesture (e.g., performed with a finger or cursor), a physical button or shortcut key (e.g., included in one of input devices 32), or other methods of receiving an indication from a user. That is, in some examples, insight visualization tool 42 may not be displayed as part of GUI 40, but may be selectable by a user.

In the example of FIG. 3, GUI 40 is displayed by computing device 16A and user 12A may review report 41. User 12A may take note of graphical representation 44F within the context of report 41 (e.g., the fact that graphical representation 44F is the shortest of all graphical representations 44), and desire to see other details of the data element underlying graphical representation 44F while maintaining the context. In accordance with one or more techniques of the present disclosure, UI module 26 may receive a first input indicating a selection of insight visualization tool 42 and in response, insight module 28 may cause computing device 16A to enter an insight mode.

In insight mode, UI module 26 may receive a second input indicating a selection of a data element of report 41. In response to receiving the second input, insight module 28 may generate one or more queries and/or one or more report specifications. Insight module 28 or other components of computing device 16A (e.g., calculation engine 25) may retrieve data (e.g., from data cubes 24) based on the generated queries. Report tool 34 may use the data retrieved from data cubes 24 as well as the report specifications generated by insight module 28, to create an insight view in accordance with one or more techniques of the present disclosure. Insight module 28 and/or report tool 34 may then send the insight view to UI module 26 to be output for display.

User 12A may complete review of the insight view and may desire to return to the underlying report 41. That is, in some examples, user 12 may desire to dismiss the insight view. Consequently, UI module 26 may receive a third input indicating a dismissal of the insight view. In some examples, the third input may indicate a selection of the insight view. In other examples, the third input may indicate a selection of report 41, insight visualization tool 42, or other input. In any case, responsive to receiving the third input, insight module 28 may cause UI module 26 to cease outputting the insight view for display. In this manner, computing device 16A may provide users with the ability to temporarily display an insight view for performing more detailed analysis or review, while still retaining the context of the underlying report. That is, computing device 16A may enable users to view further information associated with a data element without losing the "big picture" information of the original report.

Figure 4:
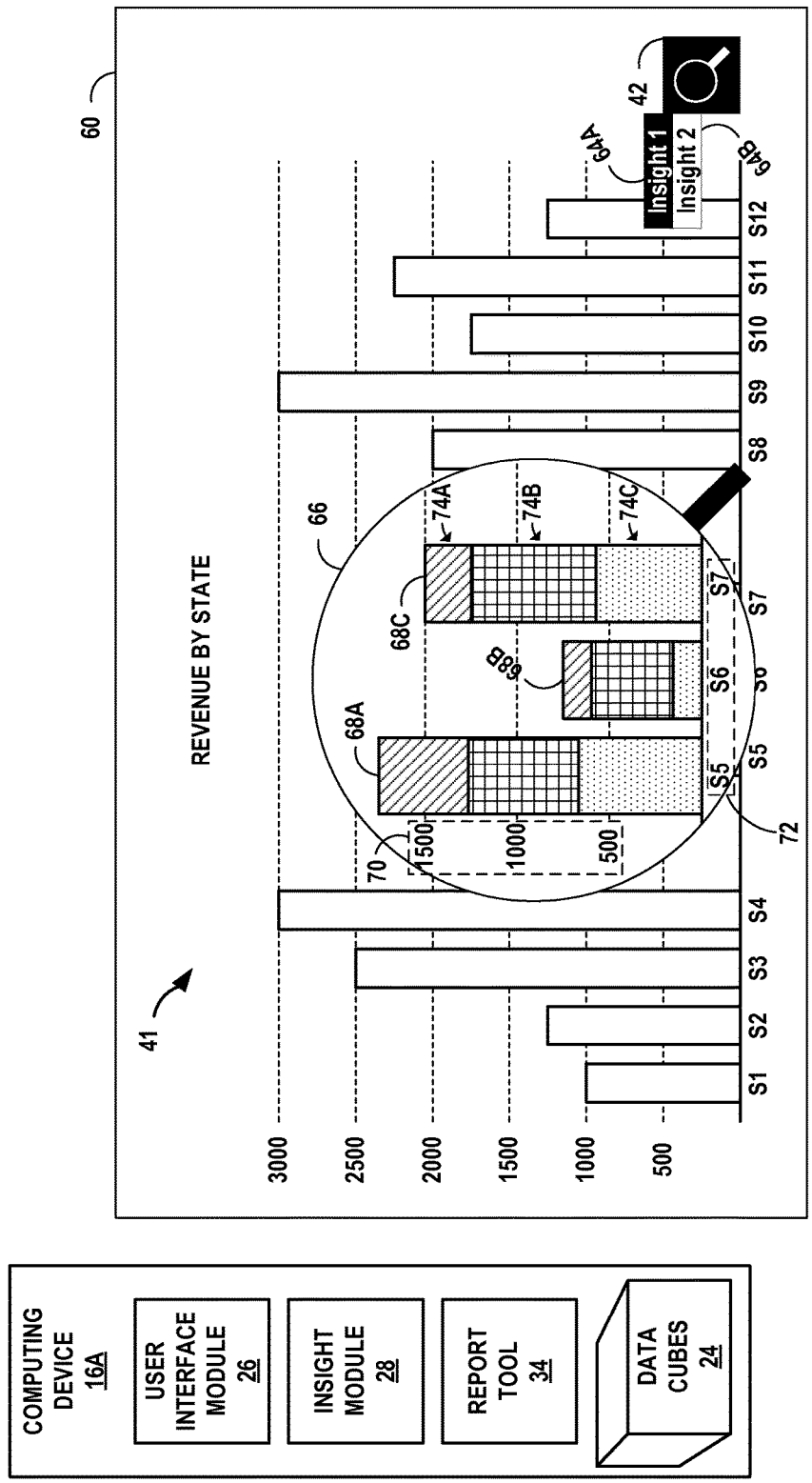
FIG. 4 is a block diagram illustrating an example computing device and GUI for providing an insight view, in accordance with one or more aspects of the present disclosure.

FIG. 4 is a block diagram illustrating an example computing device and GUI for providing an insight view, in accordance with one or more aspects of the present disclosure. For purposes of illustration only, the example shown in FIG. 4 is described in the context of computing device 16A and enterprise business intelligence system 14 as shown in FIGS. 1 and 2. As shown in FIG. 4, computing device 16A includes components, such as UI module 26, insight module 28, report tool 34, and data cubes 24. Components of computing device 16A can include functionality similar to the functionality of such components as described in FIGS. 1 and 2.

In some examples, techniques of the present disclosure may enable computing device 16A to provide insight into one or more data elements within a report by displaying an insight view containing details of the sub-elements comprising each of the data elements, in the context of the original report. Computing device 16A may receive a first input indicating a selection (e.g., from user 12A) of an insight visualization tool and a second input indicating a selection of an insight option corresponding to displaying sub-elements of a selected data element. Responsive to receiving the input indicating a selection of the insight option, computing device 16A may enter an insight mode allowing user 12A to select one or more graphical representations of data elements to include in an insight view. Computing device 16A may receive input indicating a selection of a data element, and generate an insight view displaying new graphical representations of the selected data elements, each including graphical regions corresponding to sub-elements of the respective data element.

In the example of FIG. 4, UI module 26 may output GUI 60 for display as part of a business intelligence UI. GUI 60 may initially include report 41 and insight visualization tool 42. UI module 26 may receive input (e.g., from user 12A) indicating a selection of insight visualization tool 42 and may send an indication to insight module 28. Insight module 28 may cause UI module 26 to modify the display of insight visualization tool 42, as well as output one or more selectable insight options for display. As shown in GUI 60, insight module 28 may cause UI module 26 to output insight visualization tool 42 for display in different colors. In other examples, insight module 28 may cause UI module 26 to modify the display of insight visualization tool 42 in other ways, such as by using different shapes, ceasing display of insight visualization tool 42, or any other way of visually indicating to user 12A that insight visualization tool 42 has been selected.

After receiving input indicating a selection of insight visualization tool 42, insight module 28 may cause UI module 26 to output insight option 64A and insight option 64B (collectively "insight options 64") for display in GUI 60. In the example of FIG. 4, insight option 64A may correspond to an insight view showing the revenue of individual cities for each of the selected data elements. In some examples, insight options may be defined by the author of report 41. In other examples, insight module 28 may determine possible insight options based on the report displayed or user 12A may define a desired insight option. In some examples, insight module 28 may not cause UI module 26 to output insight options for display (e.g., when only one insight option exists). In other examples, insight module 28 may cause UI module 26 to provide user 12A with other various methods of selecting an insight option.

In the example of FIG. 4, user 12A may select insight option 64A. Consequently, computing device 16A may enter insight mode, allowing user 12A to select one or more graphical representations (e.g., graphical representations 44). While in insight mode, insight module 28 may cause UI module 26 to output a modified cursor or other selection implement for display in order to visually inform user 12A. For instance, UI module 26 may output a graphical magnifying glass or other graphical object for display in place of the normal cursor. In some examples, such as when receiving input via a presence-sensitive or touch-sensitive display, UI module 26 may not output a cursor. In any case, user 12A may select one or more graphical representations of data elements. In the example of FIG. 4, user 12A may desire to view the sales of each city within State 6 (e.g., represented by graphical representation 44F in report 41). Consequently, UI module 26 may receive input indicating a selection of graphical representation 44F. UI module 26 may provide an indication of the input to insight module 28.

In response to receiving the indication, insight module 28 may generate one or more queries and/or one or more report specifications. For instance, insight module 28 may generate a query to retrieve revenue values for all cities within State 6 and send the query to calculation engine 25. Calculation engine 25 may retrieve the relevant values from data cubes 24 and/or from enterprise business intelligence system 14, and provide the results of the query to report tool 34 and/or insight module 28. In some examples, insight module 28 may retrieve the data. Insight module 28 may send generated report specifications to report tool 34. Report tool 34 may, in some examples, create insight view 66 based on the received data and report specifications. Report tool 34 may provide insight view 66 to insight module 28.

In the example of FIG. 4, insight module 28 may cause UI module 26 to output insight view 66 for display as part of GUI 60. Insight view 66 includes graphical representations 68A-68C (collectively "graphical representations 68"), revenue dimension 70, and state dimension 72. Graphical representations 68 may represent the selected data element as well as adjacent data elements. In some examples, insight view 66 may include fewer graphical representations of data elements. For instance, insight view 66 may display only a graphical representation of the selected data element. In other examples, insight view 66 may be modifiable by a user to include more or fewer graphical representations of data elements. That is, in various examples, insight views may be "stretchable" by the user to include desired data elements.

Graphical representations 68A-C of insight view 66 may be proportionately larger versions of graphical representations 44E-44G. UI module 26 may, in the example of FIG. 4, modify the output of graphical representations 44A-44D and graphical representations 44H-44L, in order to accommodate insight view 66. In other examples, such as when graphical representations 68 are the same size as graphical representations 44E-44G, UI module 26 may not modify the output of graphical representations 44. That is, in some examples UI module 26 may modify the display of an underlying report to accommodate the display of an insight view while in other examples, UI module 26 may display an insight view on top of the underlying report as-is.

Each of graphical representations 68 may include graphical regions representing each of the sub-elements within the respective data elements. For example, revenue values for States 5, 6, and 7, represented by graphical representations 68 in insight view 66, may each include revenue values for 3 cities as sub-elements. Each of graphical representations 68 may include graphical regions showing the revenue values for the state's respective cities. In other examples, graphical regions may represent other details of sub-elements included in a displayed data element, such as revenue per employee, expenditures per product, profits per employee, or other information.

In accordance with a selection of insight option 64A, the revenue value for each of the three cities of State 7 may, as one example, be shown in insight view 66 as graphical regions 74A-74C (collectively "graphical regions 74") within graphical visualization 68C. In some examples, each of graphical regions 74 may be output for display by UI module 26 in different manners to differentiate between displayed graphical regions. Some examples of different manners may include different shading, different colors, different boundaries, or other ways of visually differentiating separate graphical regions.

Graphical regions 74 may be displayed as part of insight view 66 with respect to revenue dimension 70 and state dimension 72. Revenue dimension 70 and state dimension 72 may be the same as revenue dimension 46 and state dimension 47, respectively. The size of each of graphical regions 74 may correspond to the proportional value of revenue for the corresponding city. For instance, in the example of FIG. 4, the city corresponding to graphical region 74A may have a smaller revenue value than the cities corresponding to each of graphical regions 74B and 74C. That is, insight view 66 may maintain the context of report 41 by including the same dimensions and/or by maintaining the displayed shape and relative size of the underlying data elements. By enabling user 12A to select insight visualization tool 42, choose an insight option, and select a state data element for which to view city-specific revenue information, computing device 16A may allow for greater insight into the data displayed in a report. In addition, computing device 16A may improve speed and efficiency of report review and analysis by providing user 12A with a way to view specific details of data elements within the context of the original report, without requiring user 12A to generate new reports.

Figure 5:
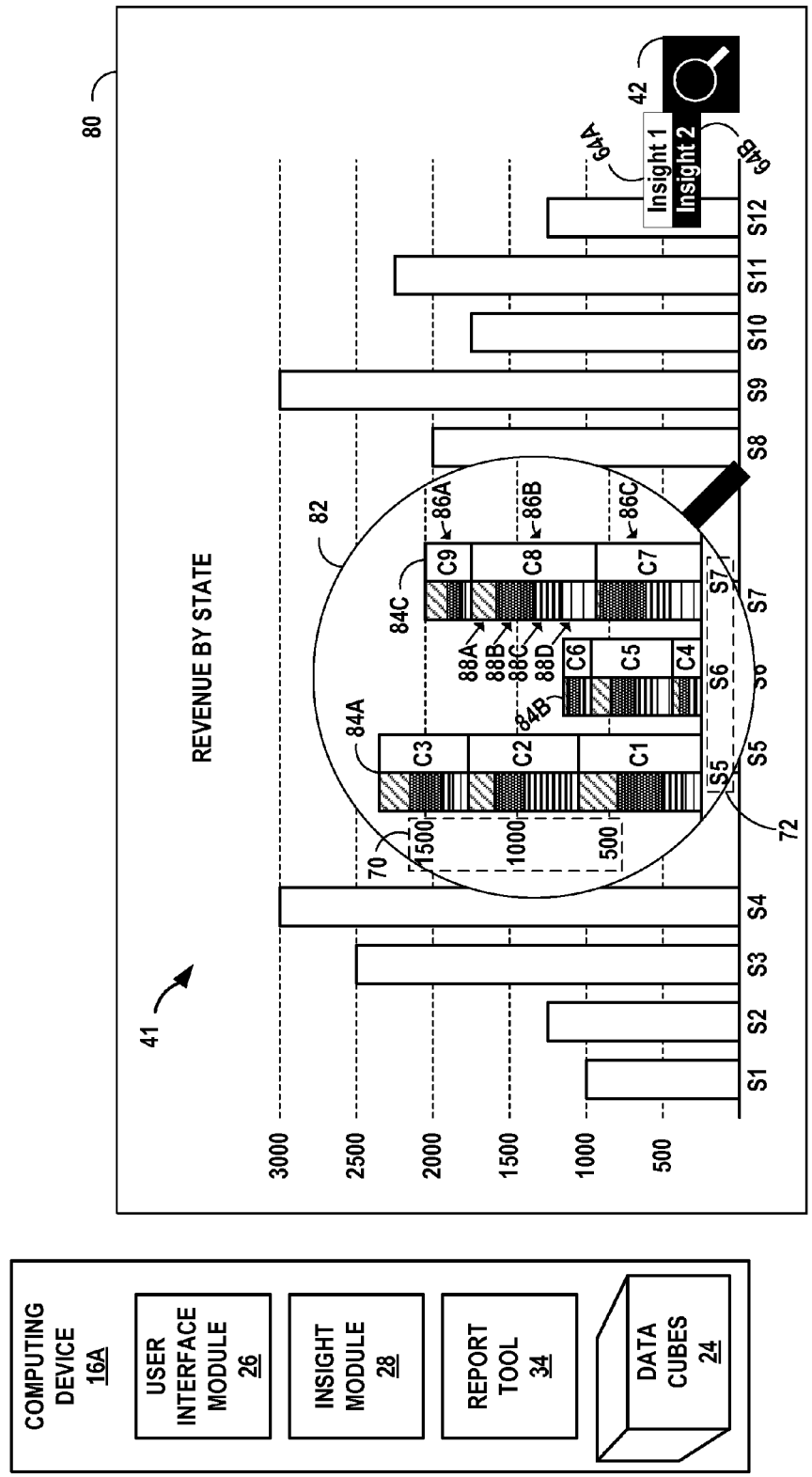
FIG. 5 is a block diagram illustrating an example computing device and GUI for providing an insight view, in accordance with one or more aspects of the present disclosure.

FIG. 5 is a block diagram illustrating an example computing device and GUI for providing an insight view, in accordance with one or more aspects of the present disclosure. For purposes of illustration only, the example shown in FIG. 5 is described in the context of computing device 16A and enterprise business intelligence system 14 as shown in FIGS. 1 and 2. As shown in FIG. 5, computing device 16A includes components, such as UI module 26, insight module 28, report tool 34, and data cubes 24. Components of computing device 16A can include functionality similar to the functionality of such components as described in FIGS. 1 and 2.

In accordance with techniques of the present disclosure, computing device 16A may display an insight view containing details of multiple types of sub-elements that make up data elements displayed in a report. Computing device 16A may receive an input indicating a selection of an insight option corresponding to displaying two types of sub-elements of a selected data element. Computing device 16A may receive input indicating a selection of a data element, and generate an insight view displaying new graphical representations of the selected data elements, each including graphical regions and graphical sub-regions corresponding to various sub-elements of the respective data element.

In the example of FIG. 5, UI module 26 may output GUI 80 for display. GUI 80 may initially include report 41 and insight visualization tool 42. UI module 26 may receive input (e.g., from user 12A) indicating a selection of insight visualization tool 42 and may send an indication to insight module 28. Insight module 28 may cause UI module 26 to output insight options 64 for display. Insight option 64B may correspond to an insight view showing revenue of each product category, separated by cities, for each of the selected data elements.

In the example of FIG. 5, user 12A may select insight option 64B. Consequently, computing device 16A may enter insight mode, in accordance with techniques of the present disclosure. User 12A may select the graphical representations corresponding to State 6 (e.g., graphical representation 44F in report 41). Consequently, UI module 26 may receive input indicating a selection of graphical representation 44F. UI module 26 may provide an indication of the input to insight module 28.

In response to receiving the indication, insight module 28 may generate one or more queries and/or one or more report specifications. In the example of FIG. 5, insight module 28 may generate one or more queries to retrieve revenue values for all cities within States 5, 6, and 7, as well as revenue values for all categories within each city, and send the query or queries to calculation engine 25. Calculation engine 25 may retrieve the relevant values from data cubes 24 and/or from enterprise business intelligence system 14, and provide the results of the query or queries to report tool 34 and/or insight module 28. Insight module 28 may send generated report specifications to report tool 34. Report tool 34 may create insight view 82 based on the received data and report specifications. Report tool 34 may provide insight view 82 to insight module 28.

In the example of FIG. 5, insight module 28 may cause UI module 26 to output insight view 82 for display as part of GUI 80. Insight view 82 includes graphical representations 84A-84C (collectively "graphical representations 84"), revenue dimension 70, and state dimension 72. Graphical representations 84 may represent the selected data element (e.g., State 6) as well as adjacent data elements (e.g., States 5 and 7). Graphical representations 84A-C of insight view 82 may be proportionately larger versions of graphical representations 44E-44G.

Each of graphical representations 84 may include graphical regions and graphical sub-regions representing various sub-elements within the respective data elements. For example, graphical representations 84 in insight view 82 may each include graphical regions each corresponding to the revenue value for a city sub-element. Each graphical region, in turn, may include one or more graphical sub-regions showing the revenue values for particular product categories (e.g., sporting goods, automotive, groceries, electronics, or other product categories). In the example of FIG. 5, the revenue value for each of the three cities of State 7 may be shown as graphical regions 86A-86C (collectively "graphical regions 86") within graphical visualization 84C.

Each of graphical regions 86 may contain four graphical sub-regions representing a product category. For instance, graphical region 86B (labeled "C8") may contain graphical sub-regions 88A-88D (collectively "graphical sub-regions 88") representing revenue values for product categories within City 8. Both graphical regions 84 and graphical sub-regions 88 may be displayed as part of insight view 82 with respect to revenue dimension 70 and state dimension 72. As in FIG. 4, the size of each of graphical regions 84 may correspond to the proportional value of revenue for the corresponding city. Furthermore, the size of each of graphical sub-regions 88 may correspond to the proportional value of revenue within the city for corresponding product categories. That is, insight view 82 may allow for further insight into data elements such as State 6 while maintaining the context of report 41 by including the same dimensions and/or by maintaining the displayed shape and relative size of the underlying data elements. By enabling user 12A to select from various insight options, computing device 16A may allow for any number of different insights into the data displayed in a report.

While insight views are shown in FIGS. 4 & 5 as displaying sub-elements of data elements included in the underlying report, various other insight views may be possible using one or more techniques of the present disclosure. For instance, a report may display income with respect to time for a number of years and one insight option may create an insight view showing new employees hired for each month in the selected year. In some examples, graphical representations display in an insight view may be further selected to generate a second insight view based on the selection. That is, insight views may be recursive in nature.

In some examples, computing device 16A may enable a user (e.g., user 12A) to perform one or more inputs to save a displayed insight view, such as when the user desires to retrieve the insight view at a later time. For instance, user 12A may right click on the displayed insight view and be provided with an option to save the insight view (e.g., as an image file) or save the report specification that generated the insight view. Computing device 16A may also provide User 12A with the ability to "maximize" the insight view. That is, computing device 16A may enable the user to enlarge the insight view to overtake the original report, thereby converting the insight view from a transient overlay, or "pop-up," to a report independent from the underlying report from which the insight view was generated.

Figure 6:
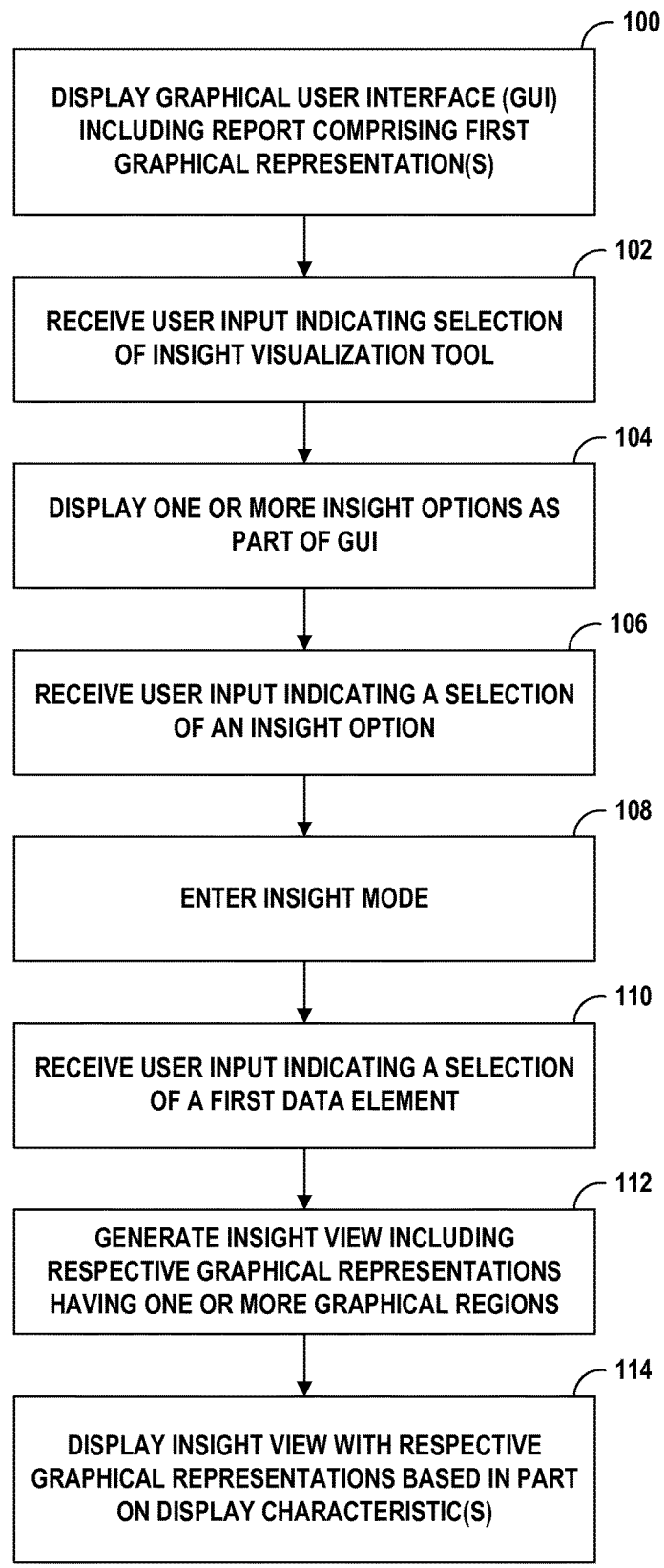
FIG. 6 is a flowchart illustrating an example process that may be used to provide an insight view, in accordance with one or more aspects of the present disclosure.

FIG. 6 is a flowchart illustrating an example process that may be used to provide an insight view, in accordance with one or more aspects of the present disclosure. For purposes of illustration only, the example process is described below within the context of computing device 16A, as shown in FIGS. 1 and 2.

In the example of FIG. 6, computing device 16A may initially display a GUI including a report, wherein the report comprises a first graphical representation of each of one or more data elements, each data element corresponding to one or more sub-elements at process step 100. In some examples, computing device 16A may also display an insight visualization tool (e.g., insight visualization tool 42 of FIGS. 3-5). Computing device 16A may receive a user input (e.g., from user 12A) indicating a selection of insight visualization tool 42 at process step 102. In response to a selection of the insight visualization tool, computing device 16A may display insight options as part of the GUI at process step 104. Computing device 16A may receive user input from user 12A indicating a selection of an insight option at process step 106. Responsive to receiving a selection of an insight option, computing device 16A may enter an insight mode at process step 108.

Computing device 16A may receive a user input from user 12A indicating a selection of a first data element included in the one or more data elements at process step 110. Computing device 16A may generate an insight view comprising respective graphical representations of each of a subset of the one or more data elements, wherein each of the respective graphical representations comprises one or more graphical regions that correspond to one or more sub-elements included in a data element represented by the respective graphical representation at step 112. Responsive to receiving the user input selecting the first data element, computing device 16A may display the insight view as part of the GUI while maintaining display of the report, wherein the respective graphical representations of the insight view are displayed based at least in part on a display characteristic that defines the displaying of the report at process step 114.

In some examples, the display characteristic comprises one of a dimension included in the report, a scale of the dimension, and a relative sizing of the first graphical representation of each of the one or more data elements with respect to one another. In some examples, the operations include receiving, by the computing device, an indication of an insight option, wherein the sub-elements included in the data element are determined based at least in part on the insight option. In some examples, the input is a first input, and the operations include receiving, by the computing device, a second input indicating a dismissal of the insight view, and responsive to receiving the second input, removing from display, by the computing device and as part of the GUI, the insight view. In some examples, the second input comprises input indicating at least one of: a selection of the insight view, a selection of the report, and a selection of the insight visualization tool.

In some examples, the input is a first input, the insight view is a first insight view, the subset is a first subset, and the operations include receiving, by the computing device, a second input indicating a selection of a particular data element included in the subset and responsive to receiving the second input, displaying, by the computing device and as part of the GUI, a second insight view comprising a second graphical representation of a second subset of the one or more data elements, the particular data element included in the second subset. In some examples, the respective graphical representations are larger than the corresponding first graphical representations, and the operations include modifying, by the computing device, the first graphical representations of the one or more data elements not included in the subset by at least one of: a change in size, a change in position, and a change in shape.

In some examples, the input is a first input, and the operations further include receiving, by the computing device, a second input indicating a command to cause the computing device to save the insight view; and responsive to receiving the second input, storing, by the computing device, a report specification defining the insight view.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various aspects of the disclosure have been described. These and other aspects are within the scope of the following claims.

What is claimed is:

1. A computer-implemented method comprising:
displaying, by a computing device having an insight module, a graphical user interface (GUI) comprising a business report, wherein the business report comprises a respective first graphical representation of each of a plurality of business report data elements;
receiving, by the computing device, a first input indicating selection of an insight mode; and
receiving, by the computing device and while in the insight mode, a second input indicating a selection of a subset of business report data elements of the plurality of business report data elements of the business report, wherein the subset of business report data elements is determined based at least in part on a location of the second input; and
responsive to receiving the second input indicating the selection of the subset of business report data elements, generating, via the insight module, an insight view comprising a respective second graphical representation of each business report data element in the subset of the business report data elements,
wherein the respective second graphical representation of a business report data element of the subset comprises and is overlaid on the respective first graphical representation of the business report data element, subdivided into respective two or more graphical regions corresponding to two or more sub-elements that form detailed portions of the business report data element,
wherein the two or more graphical regions are visually differentiated from each other, wherein the graphical regions corresponding to the sub-elements that form detailed portions of the subset of business report data elements are proportionately sized to the relative values of the sub-elements, and are displayed based at least in part on a display characteristic that defines the displaying of the business report, wherein the display characteristic comprises one of a dimension included in the report, a scale of the dimension, and a relative sizing of the first graphical representation of each of the one or more data elements with respect to one another, and
wherein the business report data elements outside of the subset remain displayed in the first graphical representation.

2. The method of claim 1, wherein the sub-elements included in the data element are determined based at least in part on an insight option received by the computing device.

3. The method of claim 1, the method further comprising:
- receiving, by the computing device, a third input indicating a dismissal of the insight view; and
- responsive to receiving the third input, removing from display, by the computing device and as part of the GUI, the insight view.

4. The method of claim 3, wherein the computing device further includes an insight visualization tool, and
- wherein the second input comprises input indicating at least one of: a selection of the insight view, a selection of the business report, and a selection of the insight visualization tool.

5. The method of claim 1, wherein the respective second graphical representations are larger than the corresponding first graphical representations, the method further comprising modifying, by the computing device, the first graphical representations of the one or more data elements not included in the subset by at least one of: a change in size, a change in position, and a change in shape.

6. The method of claim 1, wherein one or more of the business report data elements are divisible into sub-elements.

7. The method of claim 2, wherein one or more of the business report data elements are divisible into sub-elements, and
- wherein generating the insight view includes determining sub-elements of the business report data element to be included in the business report data element based at least in part on the insight option.

8. The method of claim 7, wherein one or more of the sub-elements are divisible into sub-elements.

9. The method of claim 7, wherein one of the sub-elements has a dimension, and
- wherein generating the insight view includes determining the dimension based at least in part on the insight option.

10. The method of claim 1, wherein the second input comprises an indication corresponding to hovering over the respective first graphical representation of particular business report data elements.

11. The method of claim 1, wherein displaying the GUI includes:
- increasing a respective size of the respective first graphical representation of each business report data element in the subset; and
- decreasing a respective size of the respective first graphical representation of each business report data element not in the subset.

* * * * *